3,213,136
BORIMIDAZOLES
Robert M. Washburn, Roger A. Baldwin, and Franklin A. Billig, all of Whittier, Calif., assignors to American Potash & Chemical Corporation, Los Angeles, Calif., a corporation of Delaware
No Drawing. Filed Oct. 30, 1961, Ser. No. 148,727
6 Claims. (Cl. 260—551)

The present invention relates to the preparation of new boron-nitrogen bonded compounds known as borimidazoles. More particularly, the invention relates to new monomeric and polymeric borimidazoles derived from aromatic boron compounds and aromatic polyamino compounds, and to processes for preparing the same.

The novel borimidazole monomeric compounds and the polymers of this invention are hydrolytically and thermally stable. The monomeric borimidazoles are particularly useful as antioxidants for motor oils where thermal and hydrolytic stability are necessary. The polymers have particular utility in the formation of thermally and hydrolytically stable fibers, laminates, molding resins, protective coatings, and fillers for other polymers for use in the electrical, pulp and paper industries. The polymeric borimidazoles can be used as a new type of semiconductor.

Monomeric borimidazoles prepared in accordance with the present invention may be represented by the following general formula:

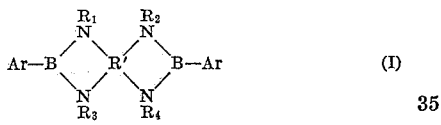

(I)

wherein $R_1$, $R_2$, $R_3$ and $R_4$ are either hydrogen or a lower alkyl group of from 1 to 8 carbon atoms; Ar is an aromatic or substituted aromatic group; and R' is an aromatic or substituted aromatic group or groups as defined below.

Polymeric borimidazoles prepared in accordance with the present invention may be represented by the following general formula:

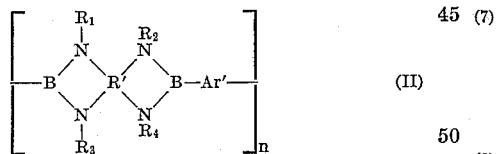

(II)

where $R_1$, $R_2$, $R_3$, $R_4$ and R' have the meaning set forth above; Ar' indicates an arylene or substituted arylene group; and n, indicating the degree of polymerization, is a whole number of at least two.

To prepare the novel monomeric borimidazole compounds of the present invention an aromatic polyamine is admixed and reacted with an arene boronic acid or a suitable derivative of an arene boronic acid. More specifically, at least two moles of the boronic acid or a suitable derivative thereof are employed for each mole of the aromatic polyamine.

Aromatic polyamines which are suitable for use in accordance with the present invention include those having at least four

groups wherein R is selected from the groups consisting of hydrogen and a lower alkyl group containing from one to eight carbon atoms. The amino group must have at least one hydrogen atom so that it can react with the aromatic boron compound. Aromatic polyamines which have been found suitable for use in preparing monomeric and polymeric borimidazoles are given in Table I.

TABLE I

*Polyamines that can be used for the preparation of monomeric and polymeric borimidazoles*

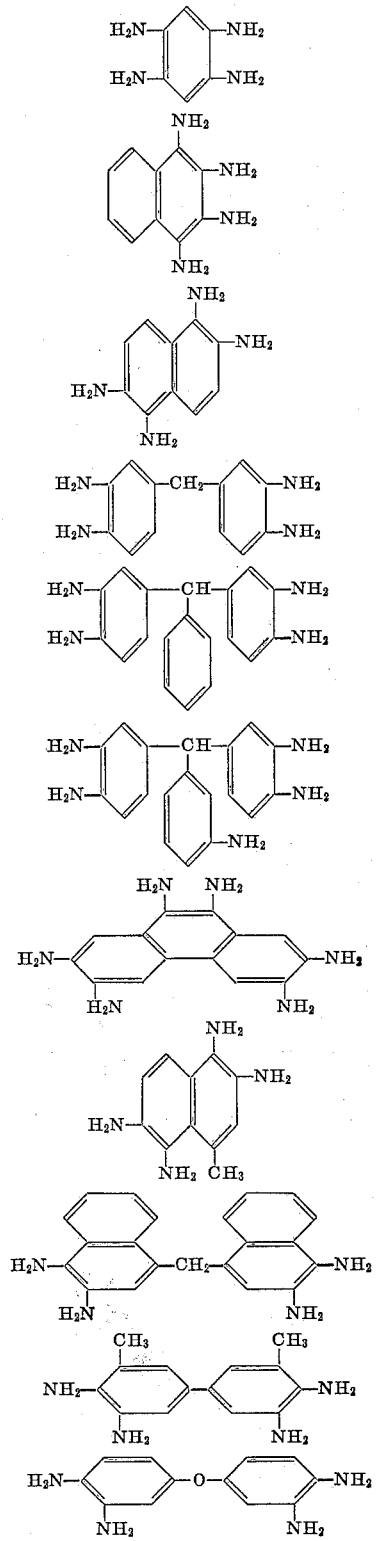

TABLE I—Continued

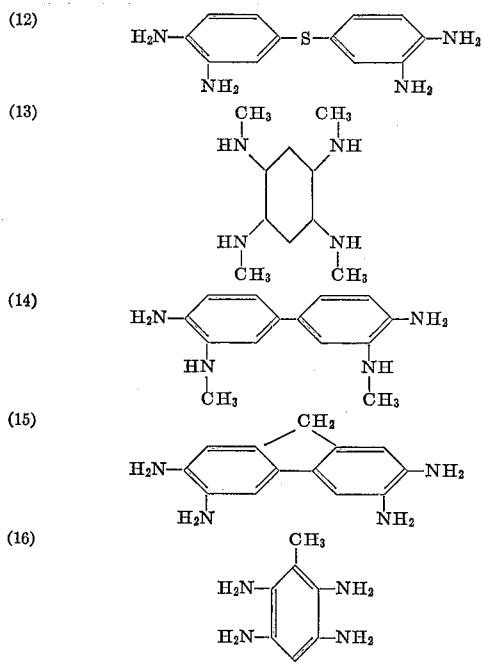

From an inspection of Formulae I and II, above, and the aromatic polyamines listed in Table I, it will be apparent that the aromatic and substituted aromatic groups which comprise R' in the formulae, above, include the following: Phenyl, substituted phenyl, naphthyl, substituted naphthyl, biphenyl, substituted biphenyl, phenanthryl, fluorenyl, as well as compounds having the general formulae

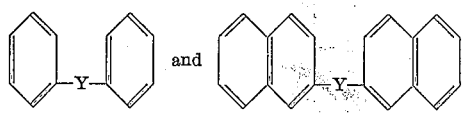

wherein Y is selected from the group consisting of oxygen, sulfur, lower alkylene groups having from one to six carbon atoms, and substituted lower alkylene groups in which the substituents are selected from the group consisting of lower alkyl groups, aromatic groups and substituted aromatic groups.

The aromatic boron compounds or areneboronic acids which may be used in the preparation of the monomeric borimidazoles of this invention are represented by the following general formula:

MAr"BZ wherein Ar" is selected from the group consisting of phenyl, naphthyl, and phenanthryl; M is selected from at least one of the group consisting of hydrogen, halogen, lower alkyl groups having from one to six carbon atoms, amino, lower alkyl amino, lower dialkylamino, acetylamino, benzoylamino, nitro, carboxyl, carbalkoxy, ureido, azo, alkoxy, aryloxy, hydroxy, mercapto, lower alkylthio, aldehydro, and keto; and Z is oxygen, dihydroxy, dihalo, diamino, bis(lower dialkylamino), di(lower alkoxy), and diaryloxy.

When Z is oxygen, the compound is an areneboronic anhydride (also named, triarylboroxine); when Z is dihydroxy, the compound is an areneboronic acid; when Z is a halo, the compound is an areneboronyl dihalide (also named, dihaloarylborane); when Z is diamino, the compound is an areneboronic amide [also named, bis(diamino)arylborane]; when Z is dialkoxy, the compound is a dialkyl areneboronate (also named, dialkoxyarylborane) and when Z is diaryloxy, the compound is a diaryl areneboronate [also named, di(aryloxy)arylborane].

Examples of areneboronic anhydrides include benzene-, p - fluorobenzene-, m - chlorobenzene-, p - bromobenzene-, m - iodobenzene-, α - naphthalene-, α - phenanthrene-, m - aminobenzene-, m - acetylaminobenzene-, p - benzoylaminobenzene-, p - carboxybenzene-, m - phenylazobenzene-, m - nitrobenzeneboronic anhydrides and the like.

Examples of areneboronic acids include 3 - nitro - 4 - bromobenzene-, 2 - bromobenzene-, 3 - bromobenzene-, 4 - bromobenzene-, 2 - hydroxy - 5 - bromobenzene-, 2 - chlorobenzene-, 3 - chlorobenzene-, 4 - chlorobenzene-, 3 - fluorobenzene-, 4 - fluorobenzene-, 3 - iodobenzene-, 4 - iodobenzene-, 2 - nitro - 5 - aminobenzene-, 2 - nitro - 4 - aminobenzene-, 3 - amino - 5 - nitrobenzene-, 3 - nitro - 4 - aminobenzene-, benzene-, m - hydroxybenzene-, m-aminobenzene-, 2,6 - dibromo - 3 - amino - 4 - carboxylbenzene-, 2 - nitro - 4 - carboxybenzene-, 3 - nitro - 4-carboxybenzene-, m - carboxybenzene-, p - carboxybenzene-, 3 - chloro - 4 - methylbenzene-, 3 - nitro - 4 - methylbenzene-, m - methylbenzene-, p- methylbenzene-, p-methylmercaptobenzene-, m - methoxybenzene-, p-methoxybenzene-, 3 - hydroxy - 4 - methylbenzene-, 2-nitro - 4 - carbmethoxybenzene-, 2 - nitro - 5 - acetylaminobenzene-, p - acetylaminobenzene-, 2,4 - dimethylbenzene-, m - ethoxybenzene-, p - ethoxybenzene-, 3-carbethoxy - 5 - nitrobenzene-, 1 - naphthalene-, 4-methoxynaphthalene - 1- ,m - phenylbenzene-, p - phenylbenzene-, 4 - dimethylaminonaphthalene - 1 -, phenanthrene - 9 - boronic acid and the like.

Examples of areneboronyl dihalides include benzeneboronyl dichloride, benzeneboronyl dibromide, p-chlorobenzeneboronyl dichloride, p-tolueneboronyl dichloride and the like.

Examples of dialkyl areneboronates include dimethyl benzene-, diethyl benzene-, dibutyl benzene-, dioctyl benzene-, dibutyl m-nitrobenzene-, dibutyl p-chlorobenzene-, dibutyl naphthaleneboronate, and the like.

Examples of diaryl areneboronates include diphenyl benzene-, diphenyl m - nitrobenzene-, di - p - tolyl m-nitrobenzene-, di-p-tolyl benzene-, di-p-tolyl p-chlorobenzene-, di - p - chlorophenyl m - nitrobenzene-, diphenyl naphthalene boronate, and the like.

Examples I–XV, below, illustrate various methods which can be employed in preparing the novel borimidazole monomers of the present invention.

EXAMPLE I

Two equivalents of an areneboronic anhydride (triarylboroxine) react with one mole of an aromatic polyamine as shown in Equation 1 to yield a monomeric borimidazole.

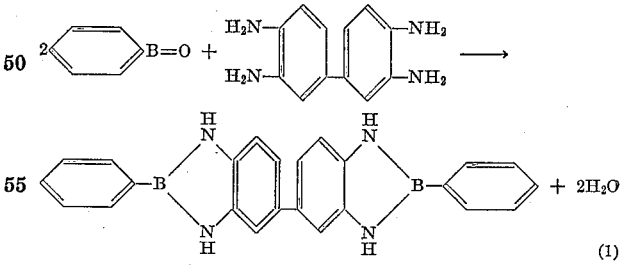

The reaction can be run with or without a solvent. If no solvent is used, the reactants are raised to the melting point of the reactants while volatilizing the water of reaction. Since the final temperature in a no-solvent reaction is dependent on physical properties of the reactants and product, it may range from about 100° C. to over 400° C. When solvents are used for the reaction, the water of reaction can be removed as a solvent-water azeotrope with solvents which form an azeotrope, or simply distilled from the reaction mixture if the solvent does not form an azeotrope with water.

Examples of suitable solvents include saturated aliphatic solvents such as cyclohexane and heptane; unsaturated aliphatic solvents such as octene, diisobutylene, and tripropylene; aromatic solvents such as benzene, toluene, xylene, ethylbenzene, chlorobenzene, and the like; oxygen-containing solvents such as ethylether, dioxane, dimethoxyethane, N,N-didecyl-p-phenoxyaniline, butanol, dialkyl and diaryl esters of arene boronic acids. Mixtures of the foregoing suitable solvents are often advantageous to bring reactants into solution and, of course, may be used.

When a solvent is used, the reaction temperature is conveniently limited to the temperature of the refluxing solvent.

The reaction time will vary considerably depending upon the reaction temperature, solvent, and physical and chemical properties of the reactants and product. Thus, at reaction temperatures of about 35° C. (refluxing diethylether solvent) a few days may be necessary, whereas with higher boiling solvents or without a solvent the reaction may be complete in a matter of minutes.

EXAMPLE II

Two moles of an areneboronic acid are reacted with one mole of an aromatic polyamine as shown in Equation 2 to give a monomeric borimidazole.

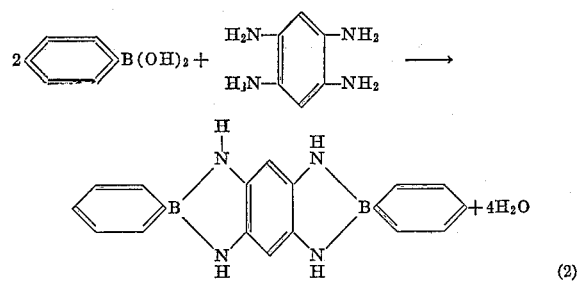

The reaction can be run in the presence or absence of solvents, as indicated in Example I.

EXAMPLE III

Two moles of an areneboronyl dihalide (aryldihaloborane) react with one mole of an aromatic polyamine to yield a monomeric borimidazole as shown in Equation 3.

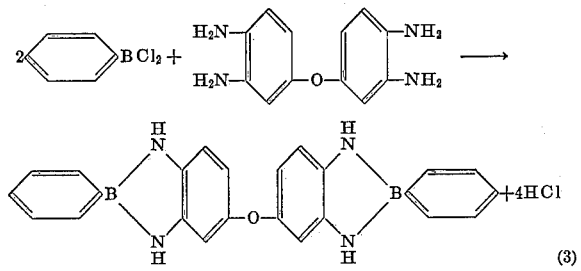

This reaction must be run under anhydrous conditions to prevent hydrolysis of the aryldihaloborane used as a starting material. The reaction can be run with or without a solvent, as indicated hereinabove. In this reaction, it is preferred to use a reagent to react with the four moles of hydrogen chloride.

Examples of materials which can be so used are tertiary amines such as trimethylamine, triethylamine, pyridine, dimethyl aniline, excess aromatic polyamino compound, and the like. When an amine is used to react with hydrogen chloride, one of the products is an ammonium chloride, a pyridinium chloride, an anilinium chloride or the like and must be removed from the product at the end of the reaction. The ammonium chloride, pyridinium chloride, or anilinium chloride can be removed from the monomeric borimidazole by sublimation or by extraction with a suitable solvent such as water or methanol.

EXAMPLE IV

Two moles of an areneboronic amide, bis(lower dialkylamino)arylborane, react with one mole of an aromatic polyamine to give a monomeric borimidazole as shown in (4)

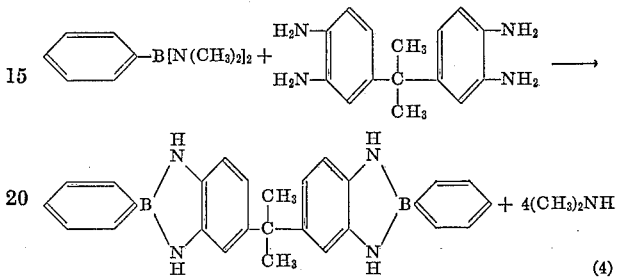

This reaction must be run under anhydrous conditions to prevent hydrolysis of the bis(diamino)arylborane used as a starting material. The reaction can be run with or without solvents. In addition to the solvents given above, an excess of a bis(dialkylamino)arylborane can be used as a solvent.

EXAMPLE V

When Z is dialkoxy the compound is a dialkyl areneboronate (dialkoxy arylborane). Two moles of a dialkyl benzeneboronate are reacted with one mole of an aromatic polyamine as shown in Equation 5 to give a monomeric borimidazole.

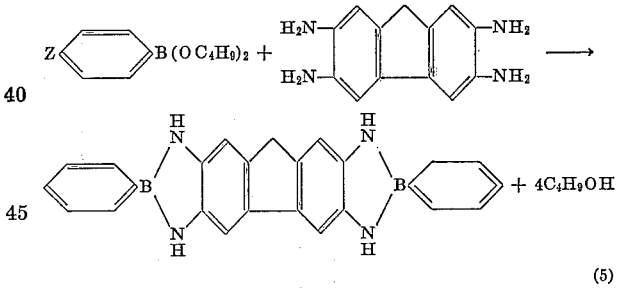

This reaction must be run under anhydrous conditions to prevent hydrolysis of the alkyl benzeneboronate used as a starting material. The reaction can be run with or without solvent. In addition to solvents given above, an excess of a dialkyl benzene boronate can also be used as a solvent. The alcohol formed is volatilized during the reaction, or can be extracted with a suitable solvent after the reaction is over.

EXAMPLE VI

When Z is diaryloxy the compound is a diaryl areneboronate (diaryloxyarylborane). Two moles of a diphenyl benzeneboronate are reacted with one mole of an aromatic polyamine as shown in Equation 6 to give a monomeric borimidazole.

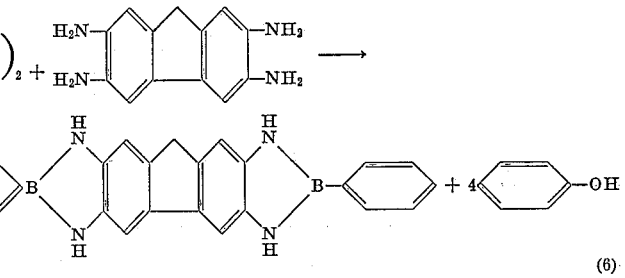

This reaction must be run under anhydrous conditions to prevent hydrolysis of the diaryl benzeneboronate used as a starting material. The reaction can be run with or without solvents, as indicated above. In addition to those solvents, an excess of the diaryl benzeneboronate starting material itself can be employed and utilized as a solvent in the reaction. The phenol formed is volatilized during the reaction or, if desired, may be extracted with a suitable solvent upon completion of the reaction.

Many of the aromatic polyamines which are suitable for reaction with an aromatic boron compound for the preparation of a monomeric borimidazole are unstable with respect to light and/or oxygen. Therefore, they preferably are stored and used as a salt such as the hydrochloride. When an aromatic polyamino hydrochloride is used as the reactant, four moles of a suitable tertiary amine preferably are added to the reaction mixture to liberate the aromatic polyamine.

EXAMPLE VII

A mixture of 2.4 g. (0.02 mole) of benzeneboronic acid and 2.1 g. (0.01 mole) of 3,3',4,4'-tetraaminobiphenyl in 50 ml. of benzene was heated under reflux for 12 hrs. The mixture was filtered to yield a dark brown borimidazole monomer in the form of a powder which was insoluble in ethanol, chloroform, and methanol and sparingly soluble in ethyl acetate. After several recrystallizations from ethyl acetate, the monomer melted at 338–340° C.

EXAMPLE VIII

The same monomeric borimidazole produced in Example VII is obtained from the reaction of dibutyl benzeneboronate and 3,3',4,4'-tetraaminobiphenyl.

EXAMPLE IX

The same monomeric borimidazole produced in Example VII is obtained from the reaction of benzeneboronic anhydride and 3,3',4,4'-tetraaminobiphenyl.

EXAMPLE X

The same monomeric borimidazole produced in Example VII is obtained when benzeneboronyl dichloride and 3,3',4,4'-tetraaminobiphenyl are allowed to react. The hydrogen chloride formed can be removed by the addition of four moles of triethylamine.

Using the general procedures outlined above, the starting materials and reaction conditions shown in Table II, below, yield the monomeric borimidazoles shown in the last column of the table.

TABLE II

| Example No. | Boron Compound | Polyamine | Solvent and/or Tert. Amine | Monomeric Borimidazole |
|---|---|---|---|---|
| XI | ⟨⟩-B(OC₄H₉)₂ | H₂N-⟨⟩-O-⟨⟩-NH₂ (with H₂N, NH₂) | Excess dibutylbenzene boronate. | (structure) |
| XII | (Cl-⟨⟩-BO)₃ | H₂N-⟨⟩-O-⟨⟩-NH₂ (with H₂N, NH₂) | Xylene | Cl-⟨⟩-B...B-⟨⟩-Cl |
| XIII | ⟨⟩-B(OH)₂, O₂N- | H₂N-⟨⟩-⟨⟩-NH₂ (with H₂N, NH₂) | — | O₂N-...NO₂ |
| XIV | ⟨⟩-B(OH)₂, O₂N- | H₂N-⟨⟩-O-⟨⟩-NH₂ (with H₂N, NH₂) | Xylene | O₂N-...NO₂ |
| XV | ⟨⟩-B(OH)₂, O₂N- | H₂N-⟨⟩(CH₃)-⟨⟩-NH₂ | Ethylbenzene. | O₂N-...NO₂ (with CH₃) |

To prepare the novel polymeric borimidazoles of this invention, an aromatic polyamine is allowed to react with an aromatic diboron compound. The aromatic polyamines which can be used are the same as those set forth hereinabove with respect to the preparation of the monomeric borimidazoles.

The arene diboron compounds which are suitable for the preparation of polymeric borimidazoles are represented by the following generalized formula.

$$MAr''(B-Z)_2$$

where Ar'', M, and Z have the same meanings as described above.

When Z, in the above formula, is oxygen, the compound is a polymeric arene diboronic acid anhydride; when Z is dihydroxy, the compound is an arene diboronic acid; when Z is dihalo the compound is an arene diboronyl dihalide [also named, bis(dihaloborano)arene]; when Z is diamino or di(lower alkyl substituted)amino, the compound is an arene diboronic acid tetraamide, [also named, bis(diaminoborano)arene or a di-lower alkyl substituted aminoborano arene]; when Z is dialkoxy the compound is a tetraalkyl arenediboronate, [also named, bis(dialkoxyborano)arene]; when Z is diaryloxy the compound is a tetraaryl arenediboronate, [also named, bis(diaryloxyborano)arene].

Examples of arenediboronic acids include benzene-1,4-diboronic acid, benzene-1,3-diboronic acid, 2-nitrobenzene-1,4-diboronic acid, 2-methylbenzene-1,4-diboronic acid, naphthalene-1,4-diboronic acid, biphenyl-4,4'-diboronic acid and the like.

Examples of arenediboronyl dihalides include 1,4-bis-(dichloroborano)benzene, 1,4-bis(dibromoborano)benzene, 1,3-bis(dichloroborano)benzene, 1,3-bis(dibromoborano)benzene, and the like.

Examples of diaminoboranoarenes or di(lower alkyl substituted aminoborano) arenes include 1,4-bis-(diamino borano) benzene, 1,3-bis-(diaminoborano) benzene, 1,4-bis-(ethylaminoborano) benzene, 1,3-bis-(ethylaminoborano) benzene, 1,4-bis-(dimethylaminoborano) benzene, 1,3-bis-(dimethylaminoborano) benzene, 1,4-bis-dibutylaminoborano) benzene, and the like.

Examples of tetraalkyl arenediboronates include tetrabutyl benzene-1,4-diboronate, tetrabutyl benzene-1,3-diboronate, tetrapropyl benzene-1,4-diboronate, tetrapropyl benzene-1,3-diboronate, tetrahexyl benzene-1,4-diboronate, tetraethyl benzene-1,3-diboronate, and the like.

Examples of tetraaryl arenediboronates include tetraphenyl 2-nitrobenzene-1,4-diboronate, tetraphenyl benzene-1,4-diboronate, tetraphenyl benzene 1,3-diboronate, tetraphenyl 3-methylbenzene-1,3-diboronate, and the like.

Examples XVI–XXVI, below, illustrate various methods which can be employed in preparing the novel borimidazoles polymers of this invention.

EXAMPLE XVI

One mole of an arenediboronic acid can be reacted with one mole of an aromatic tetraamine as shown in Equation 7 to yield a polymeric borimidazole.

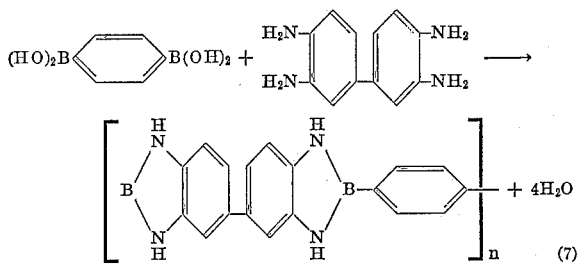

The reaction can be carried out either with or without solvent. If no solvent is used, the reactants are heated to the melting point and the water formed is removed by distillation. Suitable solvents include those described above.

EXAMPLE XVII

One mole of a bis(dihaloborano) arene can be reacted with one mole of an aromatic tetraamine as shown in Equation 8 to yield a polymeric borimidazole.

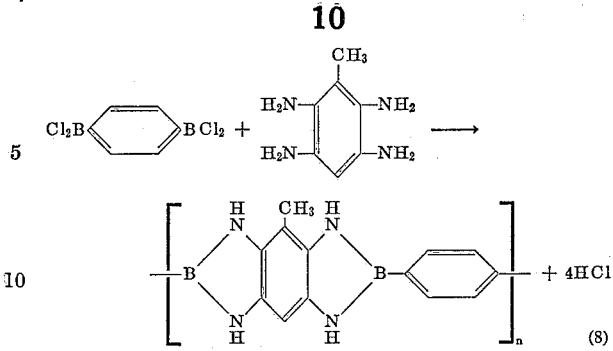

This reaction must be run under anhydrous conditions to prevent hydrolysis of the bis(dihaloborano) arene. The reaction can be run with or without solvents. Suitable solvents are given above. When haloboranes are used hydrogen chloride is a reaction product and must be removed by suitable means, as by the addition of one mole of a tertiary amine for each mole of hydrogen chloride evolved. The amine hydrochloride can then be removed by sublimation or by extraction with water or methanol.

EXAMPLE XVIII

One mole of a di[bis(lower dialkyl substituted amino)-borano] arene can be reacted with one mole of an aromatic tetramine as shown in Equation 9 to yield a polymeric borimidazole.

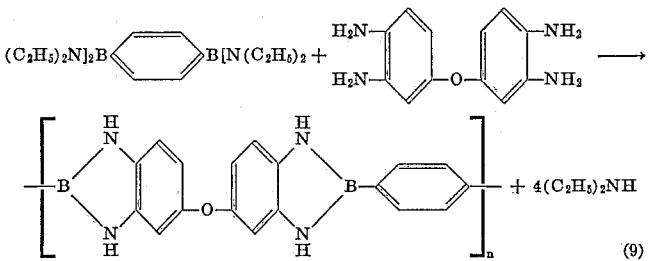

This reaction must be run under anhydrous conditions to prevent hydrolysis of the reactants. The reaction can be run with or without a solvent. Suitable solvents have been given above.

EXAMPLE XIX

One mole of a tetraalkyl arenediboronate can be reacted with one mole of an aromatic tetraamine as shown in Equation 10 to yield a borimidazole polymer.

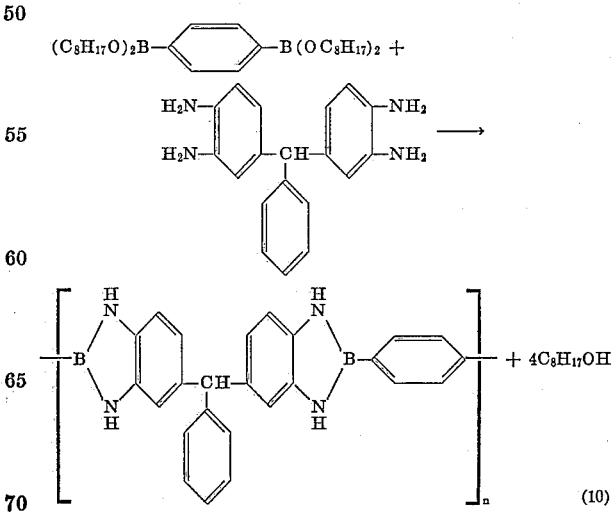

This reaction must be run under anhydrous conditions to prevent hydrolysis of the tetraalkyl arenediboronate. The reaction can be run with or without solvents, as indicated above.

EXAMPLE XX

One mole of a tetraaryl arenediboronate can be reacted with one mole of an aromatic tetraamine as shown in Equation 11 to give a polymeric borimidazole.

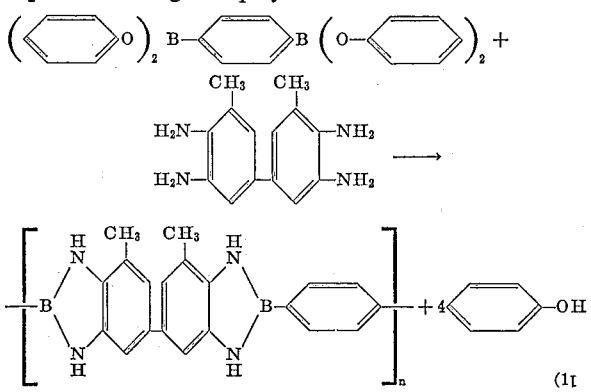

This reaction must be run under anhydrous conditions to prevent hydrolysis of the tetraaryl arene diboronate. The reaction can be run with or without solvents, as indicated above.

EXAMPLE XXI 3,3',4,4'-tetraaminobiphenyl (5.0 g., 0.023 mole) was mixed with 3.8 g. (0.023 mole) benzene-1,4-diboronic acid in 50 ml. toluene and refluxed 72 hours, removing water as the toluene-water azeotrope. The solids were collected and dried. The product was insoluble in all common organic solvents and water and soluble in sulfuric acid. The polymer did not melt and was stable to above 500° C. Analysis indicated that the material contained 4.98% B and 12.77% N.

EXAMPLE XXII 3,3',4,4'-tetraaminobiphenyl (3.2 g., 0.015 mole) was mixed with tetra-n-butyl benzene-1,4-diboronate (6.21 g., 0.015 mole) in 30 ml. N,N-didecyl-p-phenoxy-aniline. n-Butanol (4.0 g.) was recovered during 4 hours heating at 250° C. The solids were recovered by filtration, washed with 30–60° petroleum ether and air dried. The material was thermally and hydrolytically stable. Analysis of the material indicated the presence of 71.85% C., 6.78% H, 4.44% B, and 12.0% N.

EXAMPLE XXIII

The same quantities of reactants and procedure given in Example XVI were used except that the acid was benzene-1,3-diboronic acid. Approximately 95% of the theoretical quantity of water was obtained. The resulting brown, solid polymer contained 6.67% boron.

EXAMPLE XXIV

A mixture of tetrabutyl benzene -1,4-diboronate (0.015 mole) and 3,3',4,4'-tetraaminobiphenyl (0.015 mole) were treated without a solvent. Reaction occurred at about 175°, with butanol being evolved. The resulting solid polymer contained 7.0% boron.

EXAMPLE XXV

Using the same general procedure described above, reaction occurred between tetrabutyl benzene-1,4-diboronate, formed in situ from benzene-1,4-diboronic acid (0.023 mole) and butanol (0.092 mole) and 3,3',4,4'-tetraaminobiphenyl to give a brown solid, M.P.>360°.

Many aromatic polyamines are susceptible to deterioration in the presence of light and/or oxygen. However, they can be stabilized against deterioration by converting them to salts such as hydrochlorides. In order for the aromatic polyamine hydrochlorides to be used in the preparation of polymeric borimidazoles, one mole of a tertiary amine should be added for each amine hydrochloride moiety. After the reaction is complete the tertiary amine hydrochloride can be removed from the polymer by sublimation or by extraction with a suitable solvent such as water or methanol. This reaction is illustrated in Example XXVI.

EXAMPLE XXVI

Tetrabutyl benzene-1,4-diboronate and 3,3',4,4'-tetraaminodiphenylether tetrahydrochloride and triethyl amine react as described in Example XXI to give polymeric borimidazole and triethyl ammonium chloride. The triethylammonium chloride can be removed from the reaction mixture by extraction with water.

The Equations 7–11 showing some of the process variations for the preparation of borimidazole polymers indicate that a condensation reaction occurs to form only polymer and a simple by-product. However, there are usually some low molecular weight by-products formed which must be separated from the polymer before the polymer can be used. The low molecular weight by-products can be removed by sublimation or extraction with a suitable solvent such as hot water or hot methanol. The polymer which results from extraction with hot water and hot methanol usually has a theoretical analysis, but it must be treated further for maximum stability with respect to solubility, oxidation, heat, and hydrolysis. Depending on the application, the polymeric borimidazole can be stabilized before or after it is transformed into a desired shape. For example, if the polymeric borimidazole is to be used as a filler for a conventional polymer it is desirable that it be stabilized as a powder. Alternatively, if the polymeric borimidazole is to be used as a laminating resin it is desirable to stabilize after forming the laminate. The polymeric borimidazoles are converted to a thermoset state by heating. The temperature and length of heating are dependent upon the polymeric structure and may range from about 200° C. to 500° C. for a period of time ranging from a few minutes to several hours.

Example XXVII illustrates the purification of a borimidazole polymer and Example XXVIII illustrates the conversion of such a polymer to a thermoset state.

EXAMPLE XXVII

One mole of an impure borimidazole polymer, prepared as described in Example XVI, is purified by successive extractions with hot water and hot methanol to yield the polymer in pure form.

EXAMPLE XXVIII

An impure borimidazole polymer, prepared as described in Example XVI and purified as described in Example XXVII, is slightly soluble in dimethylsulfoxide and hot dioxane. Heating the polymer to 300° C. for 3 hours gives a borimidazole polymer which is no longer soluble. This polymer is stable with respect to solubility, oxidation, heat and hydrolysis.

The general formula, II, above illustrating polymeric borimidazoles, and the polymeric borimidazoles shown as products in Equations 7–11 are represented as linear structures. However, as is well known in polymer chemistry, cross-linking can occur to some degree. It is believed that the cross-linked polymer probably would have a structure as shown in Formula III

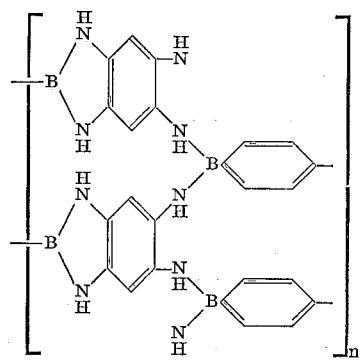

While the present invention has been described and illustrated with respect to what are believed to be its prepared embodiments it will be understood, of course, that certain substitutions and modifications may be made without departing from the true scope of the invention as defined in the appended claims.

What is claimed is:

1. A borimidazole monomer having the formula

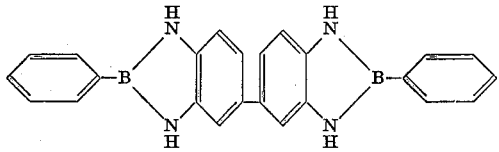

2. A borimidazole monomer having the formula

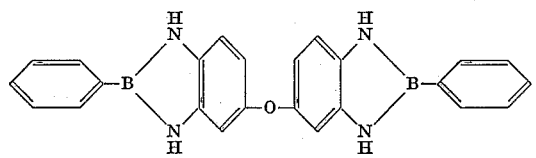

3. A borimidazole monomer having the formula

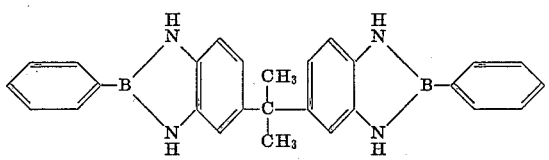

4. A borimidazole monomer having the formula

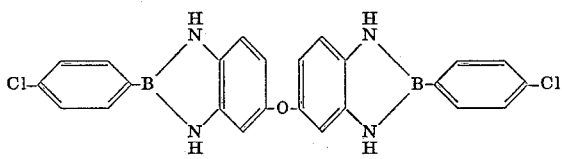

5. A borimidazole monomer having the formula

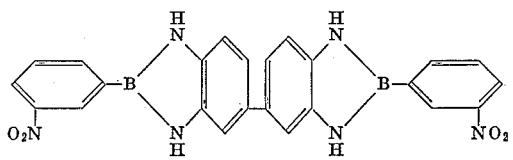

6. A borimidazole monomer having the formula

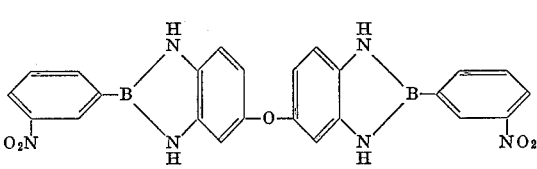

References Cited by the Examiner

UNITED STATES PATENTS 3,047,623  7/62  Milks _____ 260—551

OTHER REFERENCES

Hoste: Anal. Chim. Acta, vol. 2, page 402 (1948).
Dewar et al.: "Jour. Chem. Soc.," 1958, pages 3076–9.
Letsinger et al.: "Jour. American Chem. Soc.," vol. 80, Oct. 20, 1958, pages 5411–3.
Nyilas et al.: "Jour. American Chem. Soc.," vol. 81, 1959, pages 2681–3.
Chissick et al.: "Jour. Am. Soc.," vol. 81, Dec. 5, 1959, pages 6329–30.
Bamford et al.: "S.C.I. Monograph No. 13," 1960, pages 320–327.
Soloway: "Jour. Am. Chem. Soc.," vol. 82, May 20, 1960, pages 2442–4.

MURRAY TILLMAN, *Primary Examiner.*

HAROLD N. BURSTEIN, *Examiner.*